United States Patent
Yasuda (10) Patent No.: US 7,042,000 B2
(45) Date of Patent: May 9, 2006

(54) RADIATION IMAGE READ-OUT APPARATUS AND STIMULATING LIGHT CUT FILTER

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 218 days.

(21) Appl. No.: 10/669,017

(22) Filed: Sep. 24, 2003

(65) Prior Publication Data

US 2004/0057095 A1    Mar. 25, 2004

(30) Foreign Application Priority Data

Sep. 25, 2002  (JP)  ............... 2002-279250
Aug. 13, 2003  (JP)  ............... 2003-207468

(51) Int. Cl.
*G01N 23/04* (2006.01)

(52) U.S. Cl. ............... 250/586; 250/585; 250/581
(58) Field of Classification Search ............... 250/580, 250/581, 582, 583, 584, 585, 586, 587; 359/839, 359/884, 885
See application file for complete search history.

(56) References Cited

U.S. PATENT DOCUMENTS

| | | | |
|---|---|---|---|
| 6,369,402 B1 | 4/2002 | Gebele et al. | |
| 6,479,835 B1 | 11/2002 | Struye et al. | |
| 6,495,850 B1 | 12/2002 | Struye et al. | |
| 6,501,088 B1 | 12/2002 | Struye et al. | |
| 6,504,169 B1 | 1/2003 | Leblans et al. | |
| 6,512,240 B1 | 1/2003 | Leblans et al. | |
| 6,528,812 B1 | 3/2003 | Leblans et al. | |
| 2001/0028047 A1* | 10/2001 | Isoda | ............... 250/586 |
| 2001/0042823 A1 | 11/2001 | Isoda | |

FOREIGN PATENT DOCUMENTS

| | | |
|---|---|---|
| EP | 0 532 800 A1 | 3/1993 |
| WO | WO 01/18796 A1 | 3/2001 |
| WO | WO 02/16976 A2 | 2/2002 |

* cited by examiner

*Primary Examiner*—David Porta
*Assistant Examiner*—Christopher Webb
(74) *Attorney, Agent, or Firm*—Sughrue Mion, PLLC (57) ABSTRACT

A stimulating light cut filter is disposed between a radiation image convertor panel and a line sensor to transmit the stimulated emission and cut the stimulating light. The stimulating light cut filter includes an optical element which absorbs the stimulating light, and a reflecting layer which reflects the stimulating light.

20 Claims, 6 Drawing Sheets

RADIATION IMAGE READ-OUT APPARATUS AND STIMULATING LIGHT CUT FILTER

BACKGROUND OF THE INVENTION

1. Field of the Invention

This invention relates to a radiation image read-out apparatus and a stimulating light cut filter for the radiation image read-out apparatus, and more particularly to a radiation image read-out apparatus in which stimulated emission emitted from a radiation image convertor panel upon exposure to stimulating light is detected and to a stimulating light cut filter which transmits the stimulated emission but cuts the stimulating light.

2. Description of the Related Art

When certain kinds of phosphor are exposed to radiation such as X-rays, they store a part of energy of the radiation. Then when the phosphor which has been exposed to the radiation is exposed to stimulating light such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system, comprising a radiation image recording apparatus and a radiation image read-out apparatus, as a CR (computed radiography) in which a layer of the stimulable phosphor is exposed to a radiation passing through an object such as a human body to have a radiation image of the object stored on the stimulable phosphor sheet as a latent image, stimulating light such as a laser beam is projected onto the stimulable phosphor sheet, and the stimulated emission emitted from the stimulable phosphor sheet is photoelectrically detected, thereby obtaining an image signal (a radiation image signal) representing a radiation image of the object. There has been known a radiation image convertor panel comprising a stimulable phosphor layer formed on a substrate as a recording medium employed in the radiation image recording and reproducing system.

As the radiation image read-out apparatus, there has been known an apparatus comprising a detecting means which detects stimulated emission emitted from a radiation image convertor panel upon exposure to a line-like stimulating light beam extending in a main scanning direction and a stimulating light cut filter which is disposed between the radiation image convertor panel and the detecting means. The stimulating light cut filter is formed of, for instance, colored glass and transmits the stimulated emission but cuts the stimulating light. See, for instance, U.S. Pat. Nos. 6,479,835, 6,495,850, 6,501,088, 6,504,169, 6,512,240 and 6,528,812.

There has been a demand for shortening the space between the radiation image convertor panel and the detecting means in order to reduce the overall size of the apparatus. Especially in the case of an apparatus comprising a detecting means which detects the stimulated emission by way of an imaging optical system, the resolution can be increased by increasing the numerical aperture (NA) of the imaging optical system by bringing the detecting means nearer to the radiation image convertor panel. The detecting means can be brought nearer to the radiation image convertor panel by making thinner the stimulating light cut filter.

However, it has been difficult to make thinner the stimulating light cut filter without deteriorating the stimulating light cutting performance by improving the quality of the colored glass forming the stimulating light cut filter.

SUMMARY OF THE INVENTION

In view of the foregoing observations and description, the primary object of the present invention is to provide a stimulating light cut filter which can be thinner for given stimulating light cutting performance.

Another object of the present invention is to provide a radiation image read-out apparatus employing such a stimulating light cut filter.

In accordance with a first aspect of the present invention, there is provided a stimulating light cut filter which is disposed between a radiation image convertor panel, which emits stimulated emission upon exposure to stimulating light beam, and a detecting means, which detects the stimulated emission emitted from the radiation image convertor panel, to transmit the stimulated emission and cut the stimulating light and comprises an optical element which absorbs the stimulating light, and a reflecting layer which reflects the stimulating light.

In accordance with a second aspect of the present invention, there is provided a stimulating light cut filter which is disposed between a radiation image convertor panel, which emits stimulated emission upon exposure to stimulating light beam, and a detecting means, which detects the stimulated emission emitted from the radiation image convertor panel, to transmit the stimulated emission and cut the stimulating light and comprises a plurality of optical elements which absorb the stimulating light, and at least one reflecting layer which reflects the stimulating light.

The "plurality of optical elements" may be bonded together by way of the reflecting layer.

It is preferred that at least one reflecting layer be disposed in an optical path of the stimulated emission along which the stimulated emission propagates behind a face of the optical element upon which the stimulated emission impinges first in the optical elements of the stimulating light cut filter.

It is preferred that the transmissivity of the optical path of the stimulated emission between the position in which the stimulated emission first impinges upon the stimulating light cut filter and the position in which the stimulated emission first impinges upon the reflecting layer be not higher than 10%.

In the case where the stimulating light cut filter is provided with a plurality of the reflecting layers, it is preferred that the transmissivity between the position in which the stimulated emission first impinges upon the stimulating light cut filter and the position in which the stimulated emission first impinges upon the reflecting layer be not higher than 10%, and the transmissivities between adjacent reflecting layers be all 10% or less.

In accordance with a third aspect of the present invention, there is provided a radiation image read-out apparatus which is provided with a detecting means detecting stimulated emission emitted from a radiation image convertor panel upon exposure to a line-like stimulating light beam, and reads out a radiation image recorded on the radiation image convertor panel through an imaging optical system, wherein a stimulating light cut filter comprises an optical element which absorbs the stimulating light and a reflecting layer which reflects the stimulating light is disposed between the radiation image convertor panel and the detecting means to transmit the stimulated emission and cut the stimulating light.

In accordance with a fourth aspect of the present invention, there is provided a radiation image read-out apparatus which is provided with a detecting means detecting stimulated emission emitted from a radiation image convertor panel upon exposure to a line-like stimulating light beam and reads out a radiation image recorded on the radiation image convertor panel through an imaging optical system, wherein a stimulating light cut filter comprising a plurality of optical elements which absorb the stimulating light and at least one reflecting layer which reflects the stimulating light is disposed between the radiation image convertor panel and the detecting means to transmit the stimulated emission and cut the stimulating light.

The "plurality of optical elements" of the stimulating light cut filter may be bonded together by way of the reflecting layer.

It is preferred that the reflecting layer of the stimulating light cut filter be disposed in an optical path of the stimulated emission along which the stimulated emission propagates behind a face of the optical element upon which the stimulated emission impinges first in the optical elements of the stimulating light cut filter.

It is preferred that the transmissivity of the optical path of the stimulated emission between the position in which the stimulated emission first impinges upon the stimulating light cut filter and the position in which the stimulated emission first impinges upon the reflecting layer be not higher than 10%.

In the case where the stimulating light cut filter is provided with a plurality of the reflecting layers, it is preferred that the transmissivity of the optical path of the stimulated emission between the position in which the stimulated emission first impinges upon the stimulating light cut filter and the position in which the stimulated emission first impinges upon the reflecting layer be not higher than 10%, and the transmissivities between adjacent reflecting layers be all 10% or less.

In the stimulating light cut filter in accordance with the first aspect of the present invention, the stimulating light is cut by a combination of the optical element and the reflecting layer, whereas it has been conventionally cut solely by an optical element, and the stimulating light cut filter can be thinner for given stimulating light cutting performance since the reflecting layer is very thin. Thus the stimulating light cut filter of the first aspect of the present invention can be used in an apparatus where the space between the radiation image convertor panel and the detecting means is small.

In the stimulating light cut filter in accordance with the second aspect of the present invention, the stimulating light is cut by a combination of a plurality of optical elements and at least one reflecting layer, whereas it has been conventionally cut solely by an optical element, and the stimulating light cut filter can be thinner for given stimulating light cutting performance since the reflecting layer is very thin. Thus the stimulating light cut filter of the second aspect of the present invention can be used in an apparatus where the space between the radiation image convertor panel and the detecting means is small.

When the plurality of optical elements are bonded together by way of the reflecting layer, the stimulating light cut filter can be further smaller in thickness.

When the reflecting layer is disposed in an optical path of the stimulated emission along which the stimulated emission propagates behind a face of the optical element upon which the stimulated emission impinges first in the optical elements of the stimulating light cut filter, reflection of the stimulating light at the face of the optical element upon which the stimulated emission impinges first can be reduced, whereby reentrance of the reflected stimulating light into the radiation image convertor panel can be suppressed.

When the transmissivity of the optical path of the stimulated emission between the position in which the stimulated emission first impinges upon the stimulating light cut filter and the position in which the stimulated emission first impinges upon the reflecting layer is not higher than 10%, the thickness of the stimulating light cut filter can be surely reduced. Further, in the case where the stimulating light cut filter is provided with a plurality of the reflecting layers, when the transmissivity of the optical path of the stimulated emission between the position in which the stimulated emission first impinges upon the stimulating light cut filter and the position in which the stimulated emission first impinges upon the reflecting layer is not higher than 10%, and the transmissivities between adjacent reflecting layers be all 10% or less, the thickness of the stimulating light cut filter can be further surely reduced.

In the radiation image read-out apparatus in accordance with the third aspect of the present invention, the stimulating light is cut by a combination of the optical element and the reflecting layer, whereas it has been conventionally cut solely by an optical element, and the stimulating light cut filter can be thinner for given stimulating light cutting performance since the reflecting layer is very thin. Accordingly, the imaging optical system can be brought nearer to the radiation image convertor panel and can have an increased numerical aperture (NA), whereby the stimulated emission can be imaged at a high resolution and the radiation image read out from the radiation image convertor panel can be high in quality.

In the radiation image read-out apparatus in accordance with the fourth aspect of the present invention, the stimulating light is cut by a combination of a plurality of optical elements and at least one reflecting layer, whereas it has been conventionally cut solely by an optical element, and the stimulating light cut filter can be thinner for given stimulating light cutting performance since the reflecting layer is very thin. Accordingly, the imaging optical system can be brought nearer to the radiation image convertor panel and can have an increased numerical aperture (NA), whereby the stimulated emission can be imaged at a high resolution and the radiation image read out from the radiation image convertor panel can be high in quality.

When the plurality of optical elements are bonded together by way of the reflecting layer, the stimulating light cut filter can be further smaller in thickness.

When the reflecting layer is disposed in an optical path of the stimulated emission along which the stimulated emission propagates behind a face of the optical element upon which the stimulated emission impinges first in the optical elements of the stimulating light cut filter, reflection of the stimulating light at the face of the optical element upon which the stimulated emission impinges first can be reduced, whereby reentrance of the reflected stimulating light into the radiation image convertor panel can be suppressed.

When the transmissivity of the optical path of the stimulated emission between the position in which the stimulated emission first impinges upon the stimulating light cut filter and the position in which the stimulated emission first impinges upon the reflecting layer is not higher than 10%, the thickness of the stimulating light cut filter can be surely reduced. Further, in the case where the stimulating light cut filter is provided with a plurality of the reflecting layers, when the transmissivity of the optical path of the stimulated emission between the position in which the stimulated emission first impinges upon the stimulating light cut filter and the position in which the stimulated emission first impinges upon the reflecting layer is not higher than 10%, and the transmissivities between adjacent reflecting layers be all 10% or less, the thickness of the stimulating light cut filter can be further surely reduced.

When the stimulating light cut filter is formed by a combination of the optical element which absorbs the stimulating light and the reflecting layer which reflects the stimulating light, the thickness of the stimulating light cut filter can be greatly reduced. The reason for this will be described with reference to FIG. 6, hereinbelow.

Figure 6:
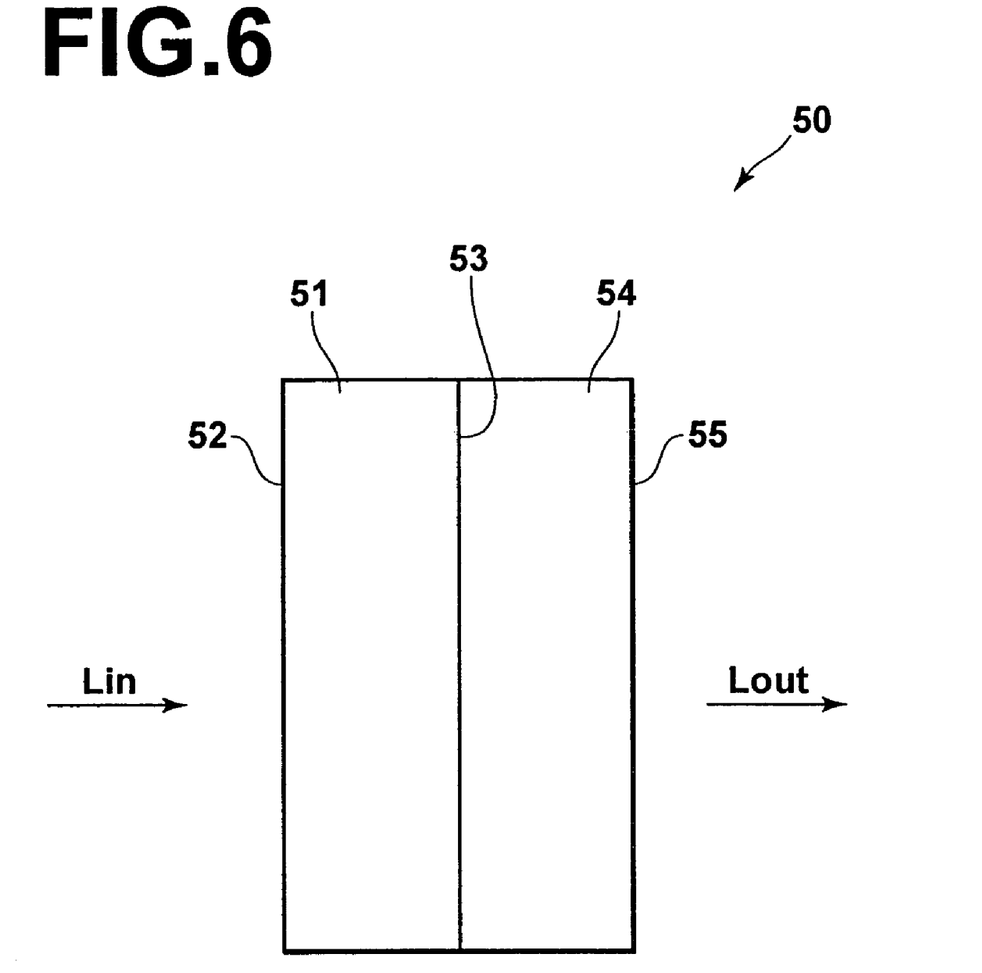
FIG. 6 is side view for illustrating the principle of the present invention.

In FIG. 6, it is assumed that a stimulating light cut filter 50 is formed by a first optical element 51 absorbing the stimulating light, a stimulating light transmitting layer 52 formed on the stimulating light inlet side of the first optical element 51, a first reflecting layer 53 formed on the stimulating light outlet side of the first optical element 51 to reflect the stimulating light, a second optical element 54 bonded to the stimulating light outlet side of the first optical element 51 by way of the first reflecting layer 53 and a second reflecting layer 55 formed on the stimulating light outlet side of the second optical element 54.

It is further assumed that the transmissivity to the stimulating light of the first and second optical elements 51 and 54 is D, the transmissivity to the stimulating light of the first and second reflecting layers 53 and 55 is T, the transmissivity of the stimulating light transmitting layer 52 to the stimulating light is 1 (100%) and the stimulating light enters the stimulating light cut filter 50 from the side of the stimulating light transmitting layer 52. Intensity of the stimulating light impinging upon the stimulating light transmitting layer 52 is represented by Lin and the intensity of the stimulating light radiated from the second reflecting layer 55 is represented by Lout.

When D≠1 (transmissivity D is not 100%), the relation between the intensity Lin and the intensity Lout is represented by the following formula.

$$Lout/Lin = \{D^2 \times T^2 + (D^2 \times T^2) \times D^2(1-T)^2 + (D^2 \times T^2) \times D^4(1-T)^4 + ...\}$$
$$= D^2 \times T^2 / [1 - \{D^2(1-T)^2\}]$$

Taking $D(1-T) \ll 1$, $Lout/Lin \approx D^2 \times T^2$ (Law of addition holds between D and T)

Assuming transmissivity T=0.01 (transmissivity T is 1%), $Lout/Lin \approx D^2 \times 0.0001$, since D<1, the transmissivity of the stimulating light cut filter is lower than 0.01%.

Whereas, when D=1 (transmissivity D is 100%), the relation between the intensity Lin and the intensity Lout is represented by the following formula.

$$Lout/Lin = T^2 + T^2(1-T)^2 + T^2(1-T)^4 + ...\}$$
$$= T^2 / \{1 - (1-T)^2\}$$
$$= T/(2-T)$$

Assuming transmissivity T=0.01 (transmissivity T is 1%), $Lout/Lin = 0.005025$, and accordingly, the transmissivity of the stimulating light cut filter is 0.5025% and the stimulating light cutting performance of the stimulating light cut filter is poorer.

That is, when the transmissivity D is small, e.g., not higher than 10%, law of addition holds between D and T by forming a stimulating light cut filter by a combination of a plurality of optical elements and a reflecting layer, whereby the transmissivity of the stimulating light cut filter can be very low. This makes it feasible to reduce the thickness of the stimulating light cut filter without deteriorating its stimulating light cutting performance.

DESCRIPTION OF THE PREFERRED EMBODIMENTS

Figure 1:
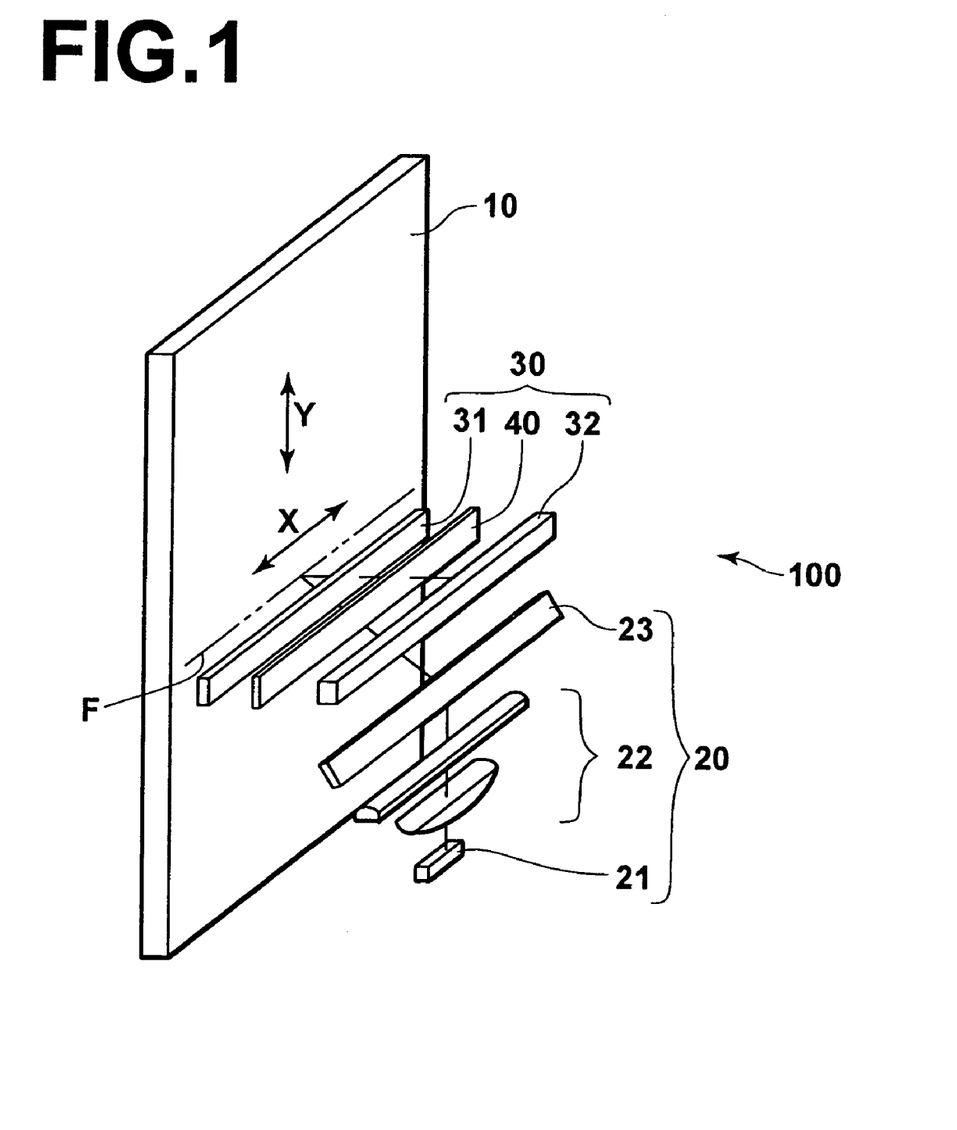
FIG. 1 is a perspective view briefly showing a radiation image read-out apparatus in accordance with an embodiment of the present invention.
Figure 2:
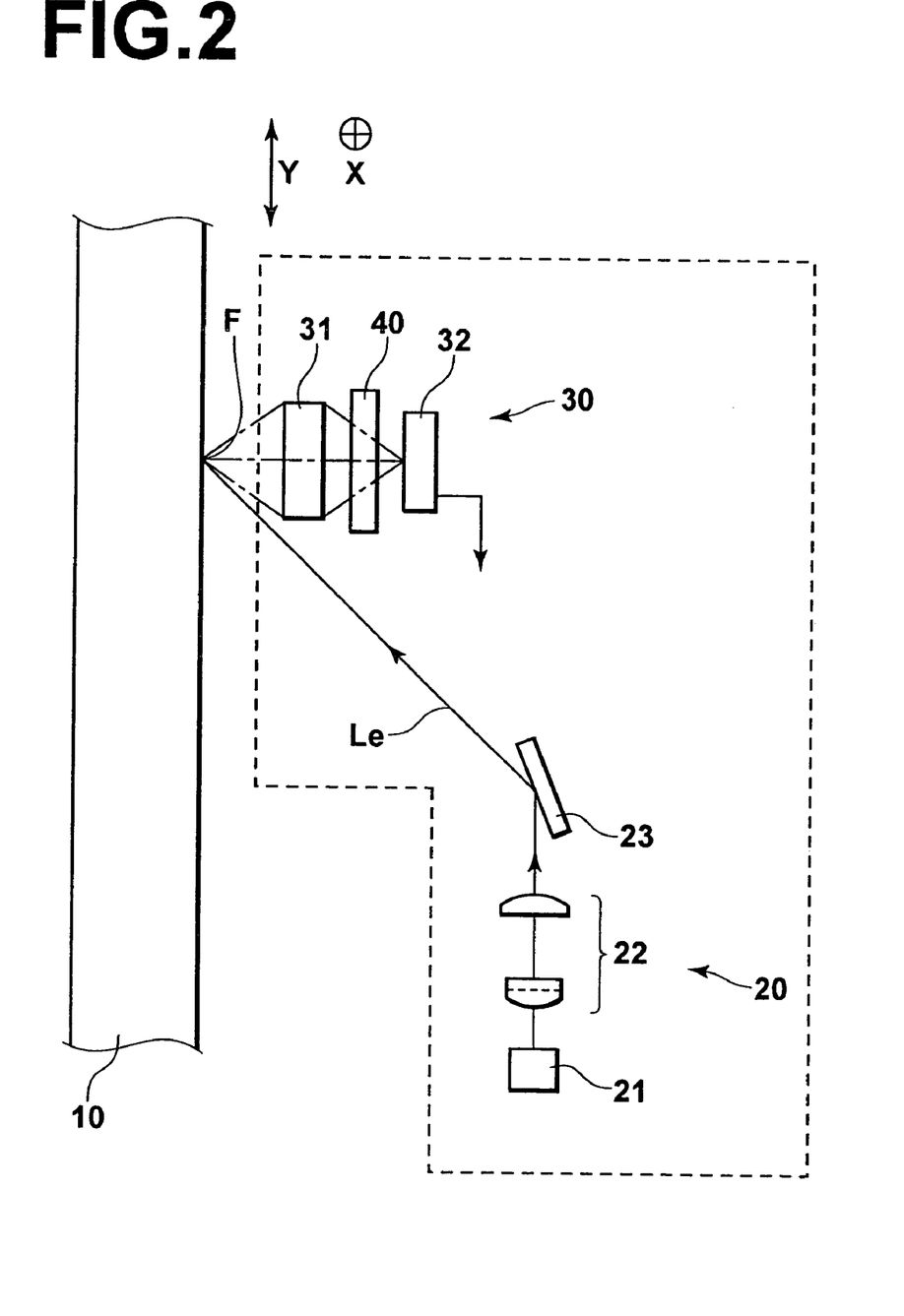
FIG. 2 is an enlarged side view showing the stimulating beam projecting system and the line sensor employed in the radiation image read-out apparatus shown in FIG. 1, FIGS. 3A to 3C are side views showing different stimulating light cut filters.

In FIGS. 1 and 2, a radiation image read-out apparatus 100 in accordance with an embodiment of the present invention comprises a stimulating light beam projecting system 20 which projects onto a radiation image convertor panel 10 a line-like stimulating light beam Le extending in a main scanning direction X (the direction of arrow X in FIGS. 1 and 2), a light receiving system 30 which detects stimulated emission emitted from the radiation image convertor panel 10 upon exposure to the stimulating light beam Le, and a conveyor means (not shown) which conveys the light receiving system 30 relatively to the radiation image convertor panel 10 in a sub-scanning direction Y (the direction of arrow Y in FIGS. 1 and 2) intersecting the main scanning direction X.

The stimulating light projecting system 20 comprises a broad area laser 21 which emits a stimulating light beam, a condenser optical system 22 which includes, for instance, a toric lens and converges a line-like stimulating light beam in a line-like area extending in the main scanning direction X on the radiation image convertor panel 10 by way of a reflecting mirror 23, and projects a line-like stimulating light beam Le onto the surface of the radiation image convertor panel 10. As the stimulating light, for instance, light of a wavelength in the range of 500 nm to 900 nm is employed.

In this particular embodiment, a semiconductor laser in 600 nm band is employed as the broad area laser 21.

The light receiving system 30 is provided with an imaging lens system 31, a line sensor (detecting means) 32 formed by a number of CCDs arranged in the main scanning direction X, and a stimulating light cut filter 40. The imaging lens system 31 comprises a number of lenses arranged in the main scanning direction X and forms an erected image of the line-like area of the radiation image convertor panel 10 exposed to the stimulating light beam Le on the line sensor 32 at unit magnification. The stimulating light cut filter 40 is inserted between the imaging lens system 31 and the line sensor 32 and transmits the stimulated emission but cuts the stimulating light.

The stimulating light cut filter 40 comprises a colored glass plate, an optical element absorbing the stimulating light, and reflecting film (a reflecting layer) which is formed on the surface of the colored glass plate and reflects the stimulating light. Alternatively, the stimulating light cut filter 40 comprises a plurality of colored glass plates, optical elements absorbing the stimulating light, and reflecting film (a reflecting layer) which is formed on the surface of at least one of the colored glass plated and reflects the stimulating light.

The stimulating light projecting system 20 and the light receiving system 30 are integrated with each other and are simultaneously conveyed in the sub-scanning direction by said conveyor means.

Operation of the radiation image read-out apparatus 100 of this embodiment will be described, hereinbelow.

A stimulating light beam Le emitted from stimulating light projecting system 20 is converged in a line-like area F extending in the main scanning direction X on the radiation image convertor panel 10. The stimulated emission emitted from the line-like area F of the radiation image convertor panel 10 upon exposure to the stimulating light beam Le is imaged on the line sensor 32 through the imaging lens system 31 and the stimulating light cut filter 40 and is photoelectrically converted to be output as electric image signal components. While projecting the stimulating light beam Le and detecting the stimulated emission, the stimulating light projecting system 20 and the light receiving system 30 are simultaneously conveyed by said conveyor means in the sub-scanning direction Y, whereby a radiation image recorded on the radiation image convertor panel 10 is read out.

Stimulating light cut filters in accordance with different embodiments of the present invention will be described with reference to FIGS. 3A to 3C, hereinbelow.

First Embodiment

Figure 3A:
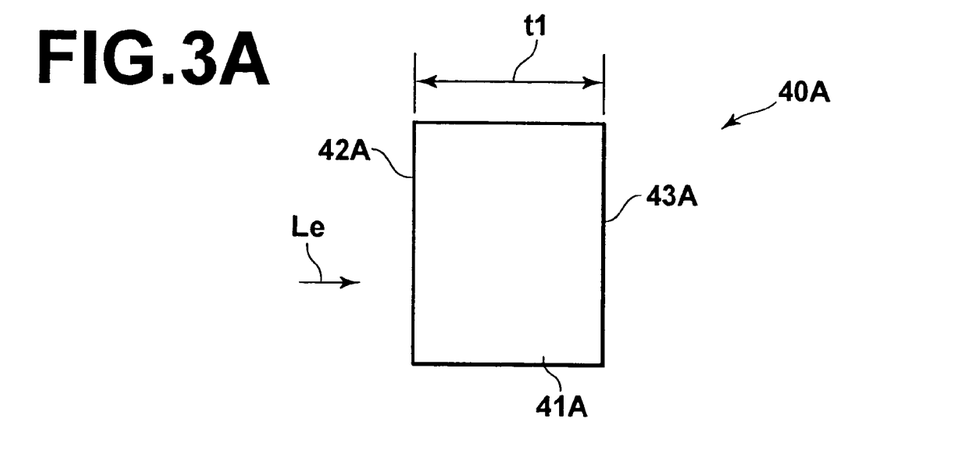

As shown in FIG. 3A, a stimulating light cut filter 40A in accordance with a first embodiment of the present invention comprises a colored glass plate 41A, a stimulating light transmitting film 42A, which transmits the stimulating light by about 100%, formed on the stimulating light inlet side of the colored glass plate 41A and a stimulating light reflecting film 43A formed on the stimulating light outlet side of the colored glass plate 41A.

In the case where the stimulating light transmissivity of the stimulating light reflecting film 43A formed on the stimulating light outlet side of the colored glass plate 41A is $1 \times 10^{-2}$, the stimulating light transmissivity of the stimulating light cut filter 40A can be $1 \times 10^{-10}$, when the colored glass plate 41A is 8 mm in thickness t1 and $1 \times 10^{-8}$ in stimulating light transmissivity.

That is, the overall thickness of the stimulating light cut filter can be reduced by 20% (from 10 mm to 8 mm) for a given stimulating light cutting performance ($1 \times 10^{-10}$) as compared with when the given stimulating light cutting performance is to be obtained solely by a colored glass plate as in the conventional stimulating light cut filter.

Second Embodiment

Figure 3B:
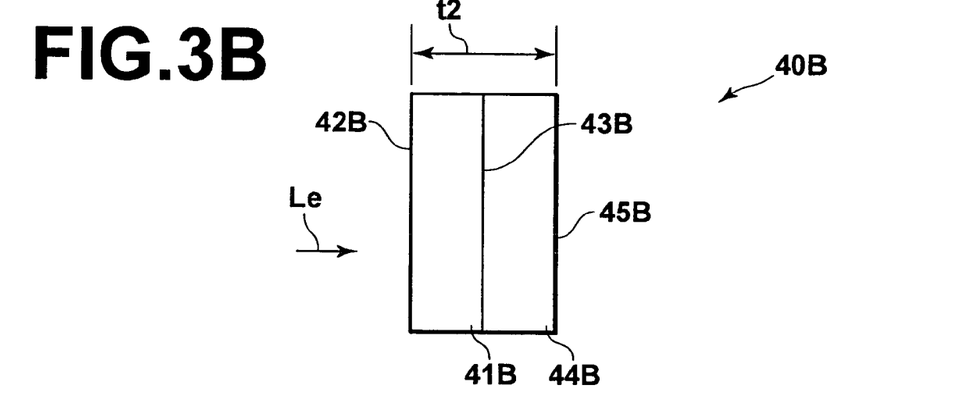

As shown in FIG. 3B, a stimulating light cut filter 40B in accordance with a second embodiment of the present invention comprises a first colored glass plate 41B, a stimulating light transmitting film 42B, which transmits the stimulating light by about 100%, formed on the stimulating light inlet side of the first colored glass plate 41B, a first stimulating light reflecting film 43B formed on the stimulating light outlet side of the first colored glass plate 41B, a second colored glass plate 44B bonded on the stimulating light outlet side of the first colored glass plate 41B by way of the first stimulating light reflecting film 43B, and a second stimulating light reflecting film 45B formed on the stimulating light outlet side of the second colored glass plate 44B.

In the case where the stimulating light transmissivities of the stimulating light reflecting films 43B and 45B formed on the stimulating light outlet side of the colored glass plates 41B and 44B are $1 \times 10^{-2}$, respectively, ($1 \times 10^{-4}$ in total), the stimulating light transmissivity of the stimulating light cut filter 40B can be $1 \times 10^{-10}$, when the colored glass plates 41B and 44B are 6 mm in total thickness t2 and $1 \times 10^{-6}$ in total stimulating light transmissivity.

That is, the overall thickness of the stimulating light cut filter can be reduced by 40% (from 10 mm to 6 mm) for a given stimulating light cutting performance ($1 \times 10^{-10}$) as compared with when the given stimulating light cutting performance is to be obtained solely by a colored glass plate as in the conventional stimulating light cut filter.

Third Embodiment

Figure 3C:
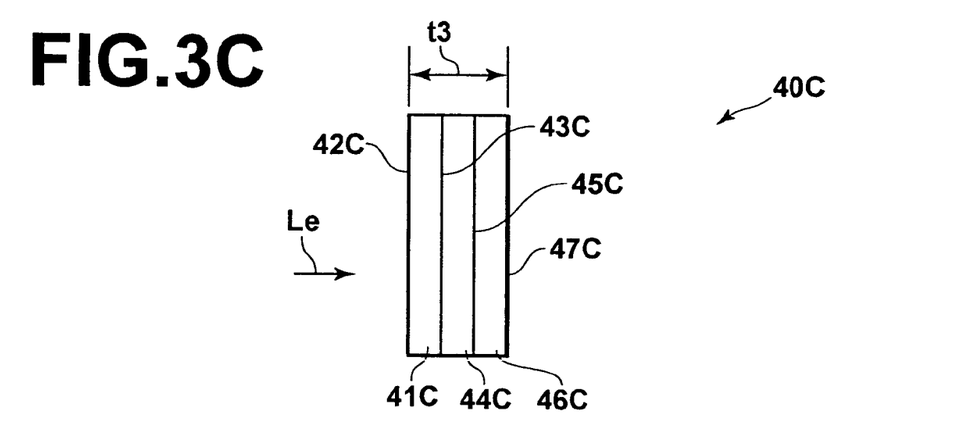

As shown in FIG. 3C, a stimulating light cut filter 40C in accordance with a third embodiment of the present invention comprises a first colored glass plate 41C, a stimulating light transmitting film 42C, which transmits the stimulating light by about 100%, formed on the stimulating light inlet side of the first colored glass plate 41C, a first stimulating light reflecting film 43C formed on the stimulating light outlet side of the first colored glass plate 41C, a second colored glass plate 44C bonded on the stimulating light outlet side of the first colored glass plate 41C by way of the first stimulating light reflecting film 43C, a second stimulating light reflecting film 45C formed on the stimulating light outlet side of the second colored glass plate 44C, a third colored glass plate 46C bonded on the stimulating light outlet side of the second colored glass plate 44C by way of the second stimulating light reflecting film 45C, and a third stimulating light reflecting film 47C formed on the stimulating light outlet side of the third colored glass plate 46C.

In the case where the stimulating light transmissivities of the stimulating light reflecting films 43C, 45C and 47C formed on the stimulating light outlet side of the colored glass plates 41C, 44C and 46C are $1 \times 10^{-2}$, respectively, ($1 \times 10^{-6}$ in total), the stimulating light transmissivity of the stimulating light cut filter 40C can be $1 \times 10^{-10}$, when the colored glass plates 41C, 44C and 46C are 4 mm in total thickness t3 and $1 \times 10^{-4}$ in total stimulating light transmissivity.

That is, the overall thickness of the stimulating light cut filter can be reduced by 60% (from 10 mm to 4 mm) for a given stimulating light cutting performance ($1 \times 10^{-10}$) as compared with when the given stimulating light cutting performance is to be obtained solely by a colored glass plate as in the conventional stimulating light cut filter.

When the stimulating light cut filter is formed by a plurality of colored glass plates, the colored glass plates need not be bonded together but may be arranged with an air gap intervening therebetween.

The stimulating light transmitting film may be eliminated.

Even if the stimulating light transmissivity of the colored glass plate is not 10% per 1 mm, the overall thickness of the stimulating light cut filter can be reduced for a given stimulating light cutting performance as compared with when the given stimulating light cutting performance is to be obtained solely by a colored glass plate as in the conventional stimulating light cut filter, by arranging the transmissivity between the position in which the stimulated emission first impinges upon the stimulating light cut filter and the position in which the stimulated emission first impinges upon the reflecting layer to be not higher than 10%, or, in the case where the stimulating light cut filter is provided with a plurality of the reflecting layers, by arranging the transmissivity between the position in which the stimulated emission first impinges upon the stimulating light cut filter and the position in which the stimulated emission first impinges upon the reflecting layer to be not higher than 10% and the transmissivities between adjacent reflecting layers to be all 10% or less.

A radiation image read-out apparatus in accordance with another embodiment of the present invention where the light receiving system is of a different arrangement will be described, hereinbelow, with reference to FIGS. 4 and 5.

Figure 4:
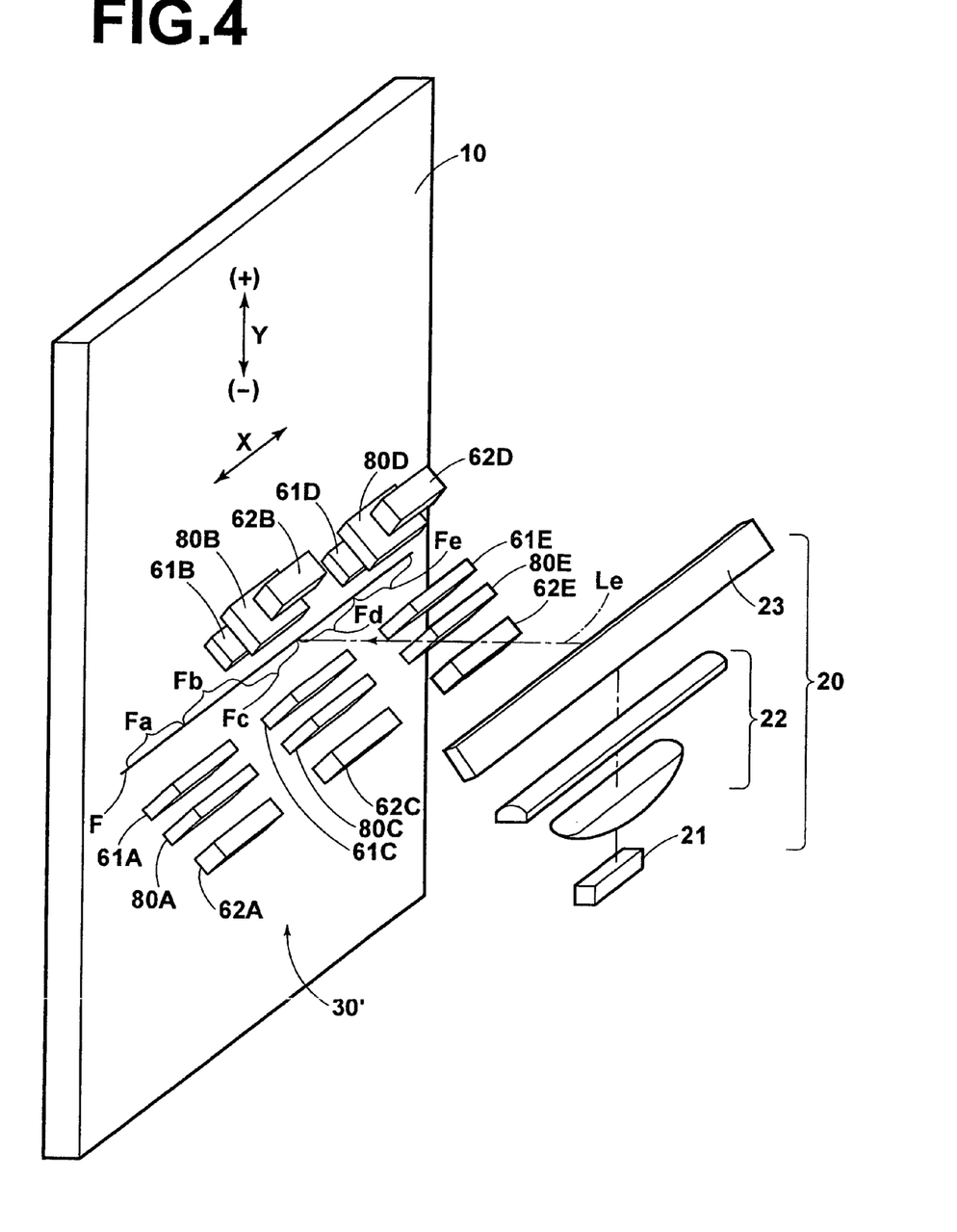
FIG. 4 is a perspective view for illustrating a radiation image read-out apparatus in accordance with another embodiment of the present invention.
Figure 5:
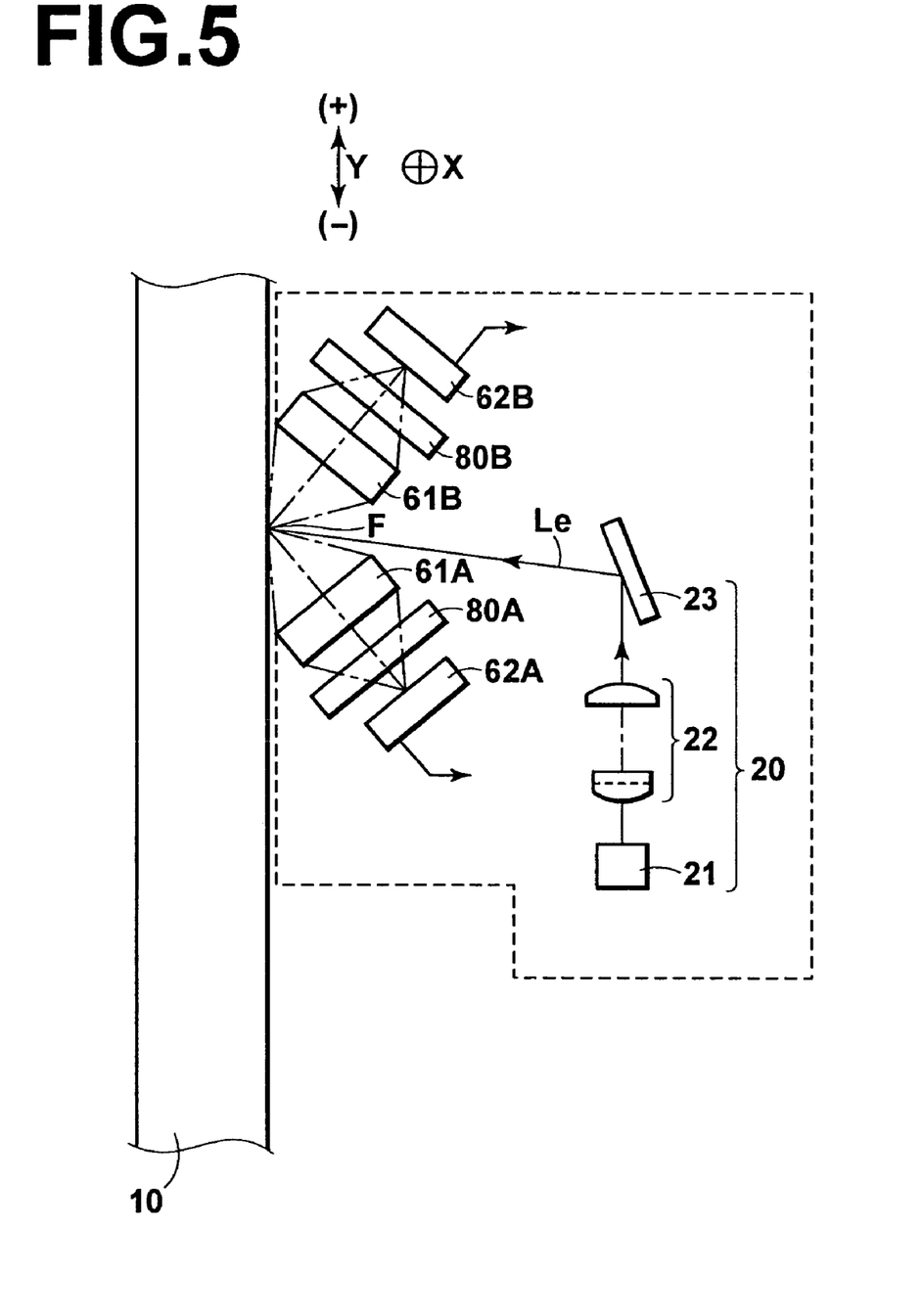
FIG. 5 is an enlarged side view showing the stimulating beam projecting system and the line sensor employed in the radiation image read-out apparatus shown in FIG. 4.

In FIGS. 4 and 5, a light receiving system 30' detects the stimulated emission emitted from the radiation image convertor panel 10 on opposite sides of a line-like area F (Fa, Fb, Fc, Fd, Fe) extending in the main scanning direction X on the radiation image convertor panel 10 exposed to the stimulating light beam Le projected from the stimulating light beam projecting system 20. The light receiving system 30' comprises five discrete line sensors 62 (62A, 62B, 62C, 62D and 62E), each comprising a number of CCDs arranged in the main scanning direction X, five discrete imaging lens systems 61 (61A, 61B, 61C, 61D and 61E), each comprising a number of refractive index profile type lenses arranged in the main scanning direction X, and five discrete stimulating light cut filters 80 (80A, 80B, 80C, 80D and 80E).

The line sensors 62A, 62C and 62E are on one side of the area F and the line sensors 62B and 62D are on the other side of the area F. That is, the line sensors 62A to 62E are arranged in a staggered fashion with the area F intervening therebetween and detect stimulated emission emitted from the respective area Fa to Fe and imaged thereon by the respective imaging lens systems 61A to 61E.

The imaging lens systems 61A to 61E are opposed to the respective line sensors 62A to 62E and are arranged in a staggered fashion with the area F intervening therebetween.

The stimulating light cut filters 80A, 80B, 80C, 80D and 80E are respectively inserted between the line sensors 62A to 62E and the imaging lens systems 61A to 61E opposed to each other. The stimulating light cut filters 80A to 80E remove the stimulating light from the stimulated emission emitted from the respective area Fa to Fe and imaged thereon by the respective imaging lens systems 61A to 61E.

The stimulating light cut filter of the present invention can be applied also to an apparatus, which, for instance, detects stimulated emission emitted from a radiation image convertor panel through a light guide and a photomultiplier without limited to those which detects stimulated emission emitted from a radiation image convertor panel by a line sensor.

What is claimed is:

1. A stimulating light cut filter which is disposed between a radiation image convertor panel, which emits stimulated emission upon exposure to stimulating light beam, and a detecting circuit, which detects the stimulated emission emitted from the radiation image convertor panel, to transmit the stimulated emission and cut the stimulating light and comprises an optical element which absorbs the stimulating light, and a reflecting layer which reflects the stimulating light, wherein the reflective layer is formed on the optical element which absorbs the stimulating light.

2. A stimulating light cut filter which is disposed between a radiation image convertor panel, which emits stimulated emission upon exposure to stimulating light beam, and a detecting circuit, which detects the stimulated emission emitted from the radiation image convertor panel, to transmit the stimulated emission and cut the stimulating light and comprises at least one optical element which absorbs the stimulating light, and at least one reflecting layer which reflects the stimulating light, wherein at least one of the reflecting layer(s) is disposed in an optical path of the stimulated emission along which the stimulated emission propagates behind a face of the optical element upon which the stimulated emission impinges first in the optical element(s) of the stimulating light cut filter.

3. A stimulating light cut filter which is disposed between a radiation image convertor panel, which emits stimulated emission upon exposure to stimulating light beam, and a detecting circuit, which detects the stimulated emission emitted from the radiation image convertor panel, to transmit the stimulated emission and cut the stimulating light and comprises an optical element which absorbs the stimulating light, and a reflecting layer which reflects the stimulating light, wherein the transmissivity of the optical path of the stimulated emission between the position in which the stimulated emission first impinges upon the stimulating light cut filter and the position in which the stimulated emission first impinges upon the reflecting layer is not higher than 10%.

4. A stimulating light cut filter which is disposed between a radiation image convertor panel, which emits stimulated emission upon exposure to stimulating light beam, and a detecting circuit, which detects the stimulated emission emitted from the radiation image convertor panel, to transmit the stimulated emission and cut the stimulating light and comprises an optical element which absorbs the stimulating light, and a reflecting layer which reflects the stimulating light, wherein the stimulating light cut filter is provided with a plurality of the reflecting layers, and the transmissivity between the position in which the stimulated emission first impinges upon the stimulating light cut filter and the position in which the stimulated emission first impinges upon the reflecting layer is not higher than 10%, and the transmissivities between adjacent reflecting layers are all 10% or less.

5. A stimulating light cut filter which is disposed between a radiation image convertor panel, which emits stimulated emission upon exposure to stimulating light beam, and a detecting circuit, which detects the stimulated emission emitted from the radiation image convertor panel, to transmit the stimulated emission and cut the stimulating light and comprises a plurality of optical elements which absorb the stimulating light, and at least one reflecting layer which reflects the stimulating light.

6. A stimulating light cut filter as defined in claim 5 in which the plurality of optical elements are bonded together by way of the reflecting layer.

7. A stimulating light cut filter as defined in claim 5 in which at least one reflecting layer is disposed in an optical path of the stimulated emission along which the stimulated emission propagates behind a face of the optical element upon which the stimulated emission impinges first in the optical elements of the stimulating light cut filter.

8. A stimulating light cut filter as defined in claim 5 in which the transmissivity of the optical path of the stimulated emission between the position in which the stimulated emission first impinges upon the stimulating light cut filter and the position in which the stimulated emission first impinges upon the reflecting layer is not higher than 10%.

9. A stimulating light cut filter as defined in claim 5 in which the stimulating light cut filter is provided with a plurality of the reflecting layers, and the transmissivity between the position in which the stimulated emission first impinges upon the stimulating light cut filter and the position in which the stimulated emission first impinges upon the reflecting layer is not higher than 10%, and the transmissivities between adjacent reflecting layers are all 10% or less.

10. A radiation image read-out apparatus which is provided with a detecting circuit which detects stimulated emission emitted from a radiation image convertor panel upon exposure to a line-like stimulating light beam, and reads out a radiation image recorded on the radiation image convertor panel through an imaging optical system, wherein a stimulating light cut filter comprising an optical element which absorbs the stimulating light and a reflecting layer which reflects the stimulating light is disposed between the radiation image convertor panel and the detecting circuit to transmit the stimulated emission and cut the stimulating light, and
wherein the reflective layer is formed on a surface of the optical element which absorbs the stimulating light.

11. A radiation image read-out apparatus which is provided with a detecting circuit which detects stimulated emission emitted from a radiation image convertor panel upon exposure to a line-like stimulating light beam, and reads out a radiation image recorded on the radiation image convertor panel through an imaging optical system, wherein a stimulating light cut filter comprising at least one optical element which absorbs the stimulating light and at least one reflecting layer which reflects the stimulating light is disposed between the radiation image convertor panel and the detecting circuit to transmit the stimulated emission and cut the stimulating light,
wherein at least one of the reflecting layer(s) of the stimulating light cut filter is disposed in an optical path of the stimulated emission along which the stimulated emission propagates behind a face of the optical element upon which the stimulated emission impinges first in the optical element(s) of the stimulating light cut filter.

12. A radiation image read-out apparatus which is provided with a detecting circuit which detects stimulated emission emitted from a radiation image convertor panel upon exposure to a line-like stimulating light beam, and reads out a radiation image recorded on the radiation image convertor panel through an imaging optical system, wherein a stimulating light cut filter comprising an optical element which absorbs the stimulating light and a reflecting layer which reflects the stimulating light is disposed between the radiation image convertor panel and the detecting circuit to transmit the stimulated emission and cut the stimulating light, and
wherein the transmissivity of the optical path of the stimulated emission between the position in which the stimulated emission first impinges upon the stimulating light cut filter and the position in which the stimulated emission first impinges upon the reflecting layer is not higher than 10%.

13. A radiation image read-out apparatus which is provided with a detecting circuit which detects stimulated emission emitted from a radiation image convertor panel upon exposure to a line-like stimulating light beam, and reads out a radiation image recorded on the radiation image convertor panel through an imaging optical system, wherein a stimulating light cut filter comprising an optical element which absorbs the stimulating light and a reflecting layer which reflects the stimulating light is disposed between the radiation image convertor panel and the detecting circuit to transmit the stimulated emission and cut the stimulating light, and
wherein the stimulating light cut filter is provided with a plurality of the reflecting layers, and the transmissivity between the position in which the stimulated emission first impinges upon the stimulating light cut filter and the position in which the stimulated emission first impinges upon the reflecting layer is not higher than 10%, and the transmissivities between adjacent reflecting layers of the stimulating light cut filter are all 10% or less.

14. A radiation image read-out apparatus which is provided with a detecting circuit which detects stimulated emission emitted from a radiation image convertor panel upon exposure to a line-like stimulating light beam and reads out a radiation image recorded on the radiation image convertor panel through an imaging optical system, wherein a stimulating light cut filter comprising a plurality of optical elements which absorb the stimulating light and at least one reflecting layer which reflects the stimulating light is disposed between the radiation image convertor panel and the detecting circuit to transmit the stimulated emission and cut the stimulating light.

15. A radiation image read-out apparatus as defined in claim 14 in which the plurality of optical elements of the stimulating light cut filter are bonded together by way of the reflecting layer.

16. A radiation image read-out apparatus as defined in claim 14 in which at least one reflecting layer of the stimulating light cut filter is disposed in an optical path of the stimulated emission along which the stimulated emission propagates behind a face of the optical element upon which the stimulated emission impinges first in the optical elements of the stimulating light cut filter.

17. A radiation image read-out apparatus as defined in claim 14 in which the transmissivity of the optical path of the stimulated emission between the position in which the stimulated emission first impinges upon the stimulating light cut filter and the position in which the stimulated emission first impinges upon the reflecting layer is not higher than 10%.

18. A radiation image read-out apparatus as defined in claim 14 in which the stimulating light cut filter is provided with a plurality of the reflecting layers, and the trafismissivity between the position in which the stimulated emission first impinges upon the stimulating light cut filter and the position in which the stimulated emission first impinges upon the reflecting layer is not higher than 10%, and the transmissivities between adjacent reflecting layers of the stimulating light cut filter are all 10% or less.

19. A stimulating light cut filter which is disposed between a radiation image convertor panel, which emits stimulated emission upon exposure to stimulating light beam, and a detecting circuit, which detects the stimulated emission emitted from the radiation image convertor panel, to transmit the stimulated emission and cut the stimulating light and comprises an optical element which absorbs the stimulating light, and a reflecting layer which reflects the stimulating light, wherein the reflective layer is disposed behind the optical element with respect to a propagation path of the stimulated emission.

20. A radiation image read-out apparatus which is provided with a detecting circuit which detects stimulated emission emitted from a radiation image convertor panel upon exposure to a line-like stimulating light beam, and reads out a radiation image recorded on the radiation image convertor panel through an imaging optical system, wherein a stimulating light cut filter comprising an optical element which absorbs the stimulating light and a reflecting layer which reflects the stimulating light is disposed between the radiation image convertor panel and the detecting circuit to transmit the stimulated emission and cut the stimulating light, and wherein the reflective layer is disposed behind the optical element with respect to a propagation path of the stimulated emission.

* * * * *